US010975961B2

(12) United States Patent
Ooshima et al.

(10) Patent No.: US 10,975,961 B2
(45) Date of Patent: Apr. 13, 2021

(54) VEHICLE CONTROL DEVICE AND VEHICLE CONTROL METHOD

(71) Applicant: ISUZU MOTORS LIMITED, Tokyo (JP)

(72) Inventors: Tatsuya Ooshima, Saitama (JP); Nobuyuki Nishimura, Yokohama (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 16/612,689

(22) PCT Filed: May 10, 2018

(86) PCT No.: PCT/JP2018/018033
§ 371 (c)(1),
(2) Date: Nov. 11, 2019

(87) PCT Pub. No.: WO2018/207853
PCT Pub. Date: Nov. 15, 2018

(65) Prior Publication Data
US 2020/0096098 A1 Mar. 26, 2020

(30) Foreign Application Priority Data

May 12, 2017 (JP) .............................. JP2017-095964

(51) Int. Cl.
*F16H 59/66* (2006.01)
*F16H 61/16* (2006.01)
(Continued)

(52) U.S. Cl.
CPC .......... *F16H 61/16* (2013.01); *F16H 59/141* (2013.01); *F16H 59/66* (2013.01); *F16H 59/74* (2013.01);
(Continued)

(58) Field of Classification Search
CPC ......... F16H 2059/366; F16H 2059/663; F16H 2059/6815; F16H 2059/142; F16H 59/44;
(Continued)

(56) References Cited

U.S. PATENT DOCUMENTS 5,931,886 A   8/1999  Moroto et al.
8,781,695 B2* 7/2014  Bianco ............... F16H 61/0213
                                                          701/51

(Continued)

FOREIGN PATENT DOCUMENTS

CN        103797279 A     5/2014
DE    102013012782 A1     2/2015
(Continued)

OTHER PUBLICATIONS

International Search Report and Written Opinion for PCT App No. PCT/JP2018/018033 dated Aug. 7, 2018, 8 pgs.
(Continued)

*Primary Examiner* — Edwin A Young
(74) *Attorney, Agent, or Firm* — Procopio, Cory Hargreaves & Savitch LLP

(57) ABSTRACT

This vehicle control device 10 is provided with: a current gear stage selection unit 13 which, on the basis of the travel resistance of the vehicle, selects a current gear stage, which is the gear stage of the vehicle in the current travel segment where the vehicle is traveling; a next gear stage selection unit 16 which selects a next gear stage, which will be the gear stage of the vehicle in the next travel segment, forwards in the travel direction of the vehicle, having a road slope different from that of the current travel segment; and a shift control unit 17 which, if during travel of the vehicle in the current travel segment in the current gear stage, the current gear stage selection unit 13 has newly selected a target gear stage higher than the next gear stage, controls shifting such (Continued)

that upshifting from the current gear stage to the target gear stage is suppressed and the current gear stage is maintained. If, in a state in which upshifting is suppressed, the engine rotation speed reaches or exceeds a prescribed value during travel in the current travel segment, the shift control unit 17 controls shifting so as to upshift to the target gear stage without suppression of upshifting.

8 Claims, 5 Drawing Sheets

(51) Int. Cl.
*F16H 59/14* (2006.01)
*F16H 59/74* (2006.01)

(52) U.S. Cl.
CPC .. *F16H 2059/142* (2013.01); *F16H 2059/663* (2013.01); *F16H 2061/163* (2013.01); *F16H 2061/166* (2013.01); *F16H 2312/00* (2013.01)

(58) Field of Classification Search
CPC ........ F16H 59/66; F16H 59/70; F16H 59/141; F16H 59/74; F16H 2061/0012; F16H 2061/0015; F16H 2061/0216; F16H 2061/022; F16H 2061/0234; F16H 2061/163; F16H 2061/166; F16H 61/0213; F16H 61/16
See application file for complete search history.

(56) References Cited

U.S. PATENT DOCUMENTS

| | | | |
|---|---|---|---|
| 2012/0123651 A1* | 5/2012 | Johansson | F16H 61/0213 701/51 |
| 2013/0151093 A1* | 6/2013 | Dourra | F16H 61/08 701/59 |
| 2013/0297161 A1 | 11/2013 | Gibson et al. | |
| 2014/0229081 A1 | 8/2014 | Iwase et al. | |
| 2015/0149052 A1 | 5/2015 | Jeong et al. | |
| 2015/0362065 A1* | 12/2015 | Johansson | F16H 59/36 701/65 |
| 2016/0047467 A1* | 2/2016 | Andersson | F16H 61/0213 701/54 |
| 2018/0051802 A1 | 2/2018 | Ishiguro et al. | |

FOREIGN PATENT DOCUMENTS

| | | |
|---|---|---|
| JP | 09021457 A | 1/1997 |
| JP | 2006177442 A | 7/2006 |
| JP | 2009115270 A | 5/2009 |
| JP | 2014001823 A | 1/2014 |
| JP | 2015102243 A | 6/2015 |
| JP | 2016183728 A | 10/2016 |

OTHER PUBLICATIONS

Office Action for related CN App. No. 201880030976.X dated Jul. 21, 2020. English translation provided; 13 pages.

* cited by examiner

[FIG. 1]
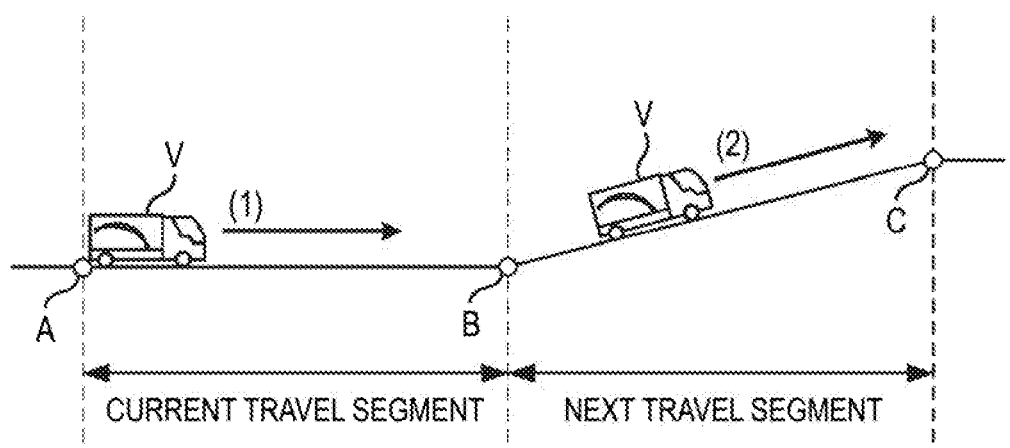

[FIG. 2]
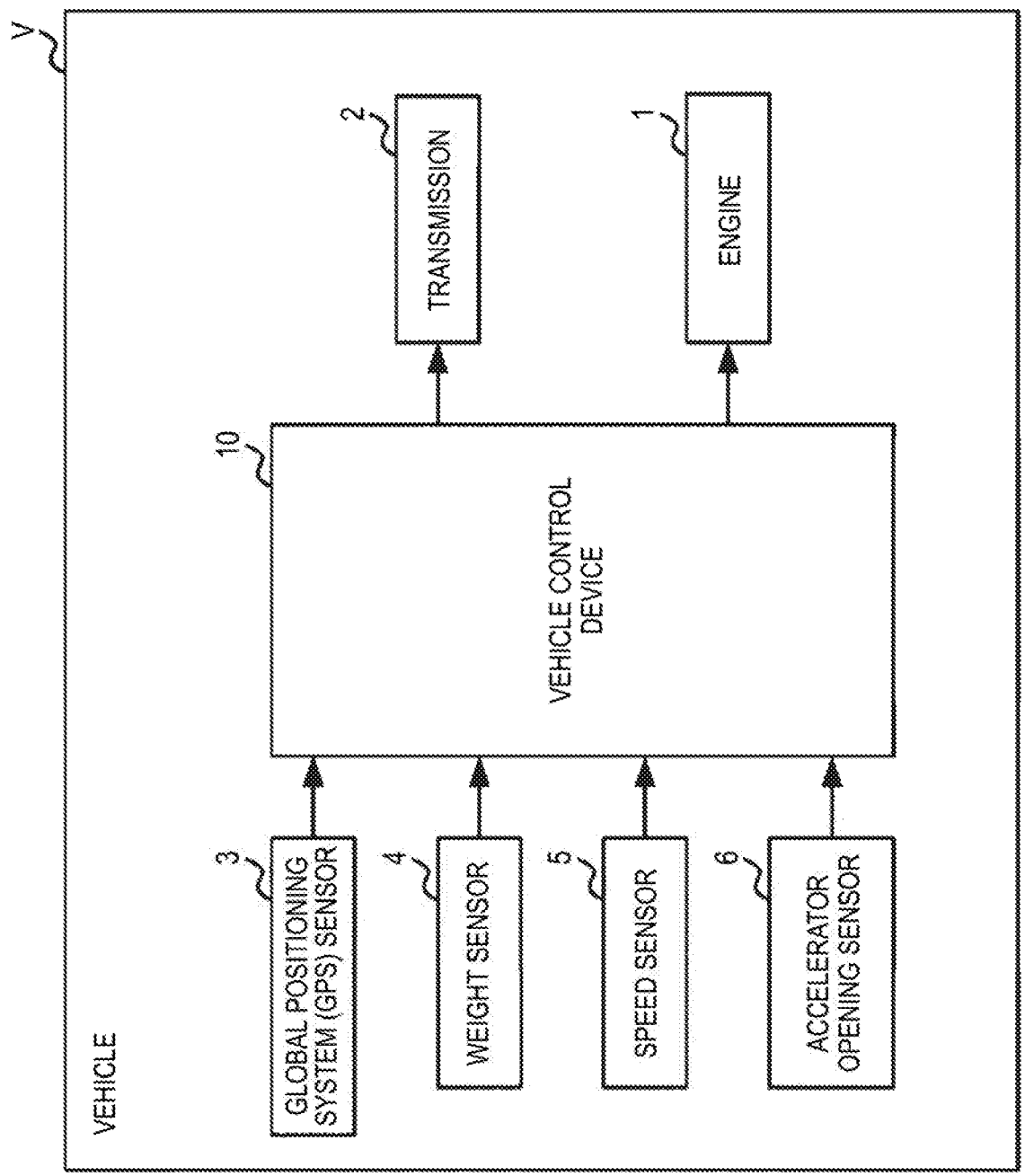

[FIG. 3]
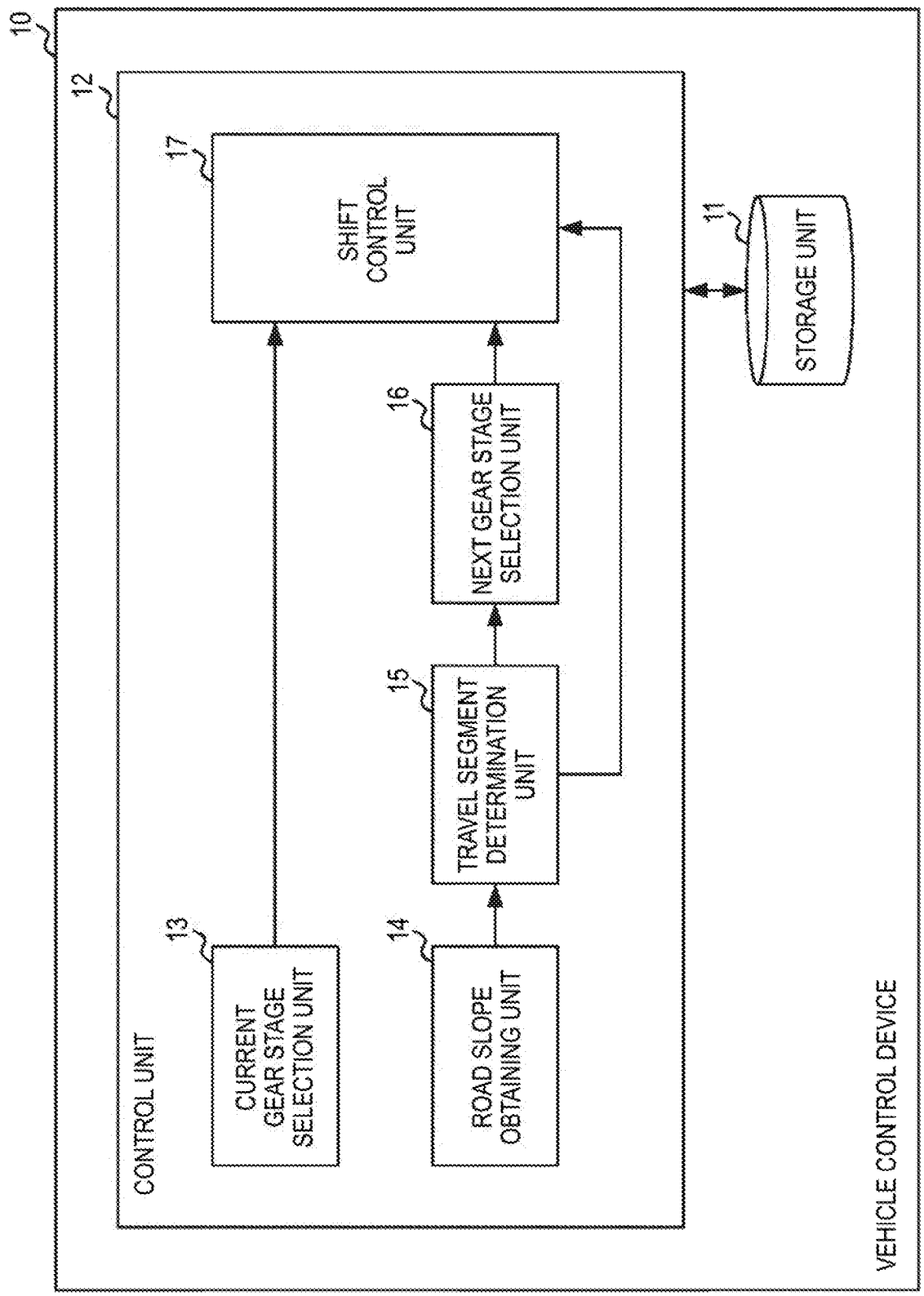

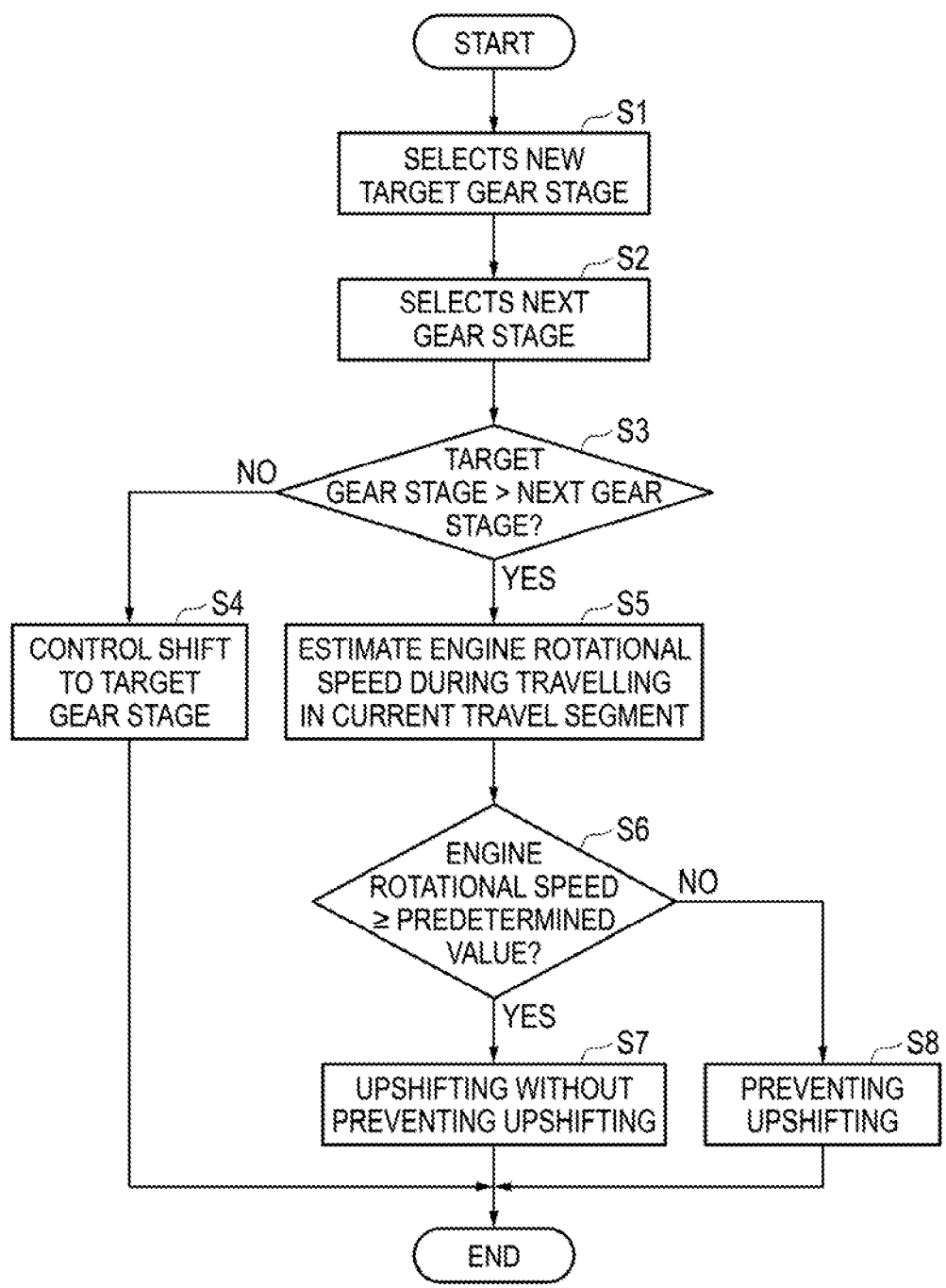
[FIG. 4]

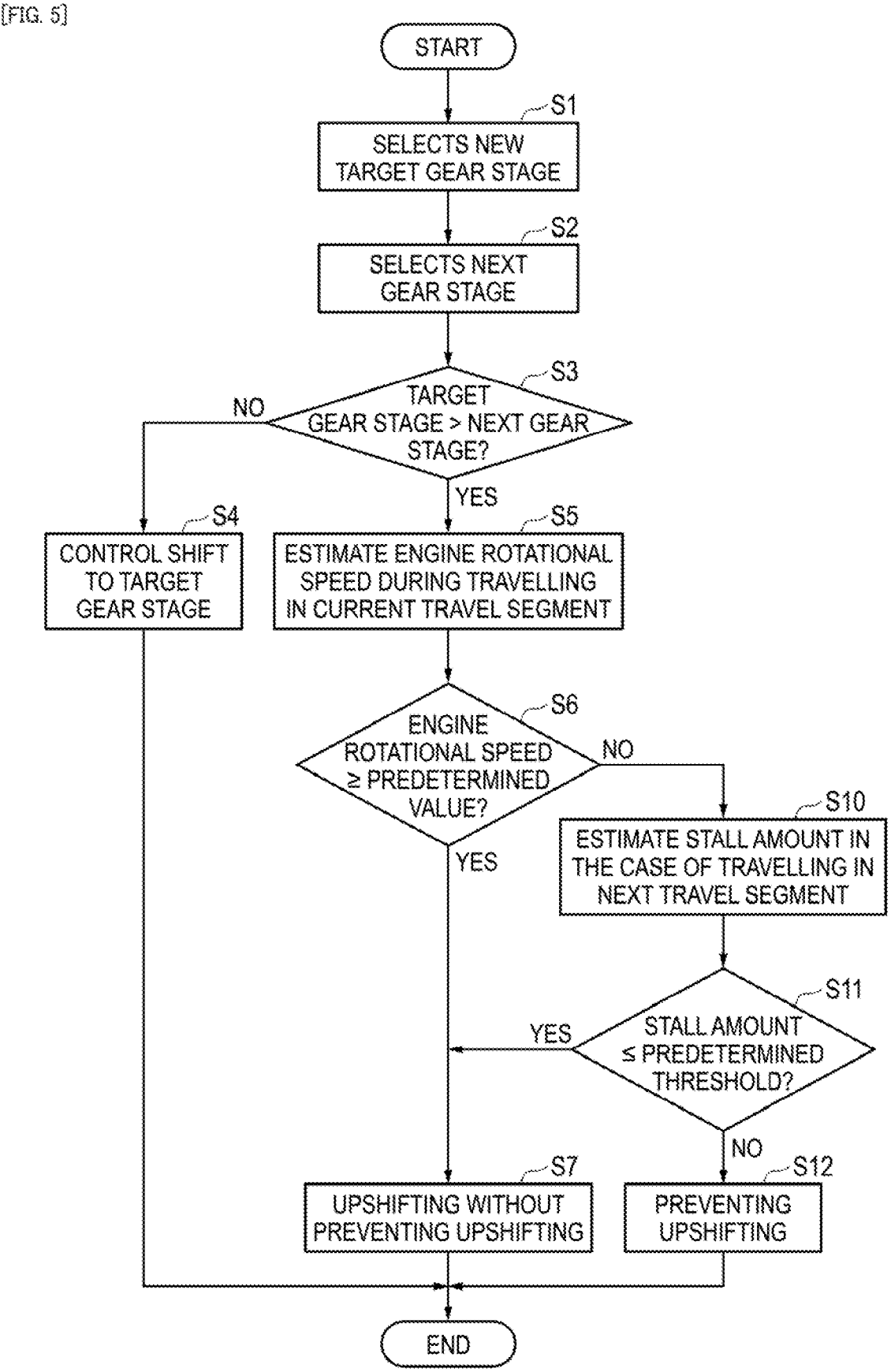

VEHICLE CONTROL DEVICE AND VEHICLE CONTROL METHOD

CROSS-REFERENCE TO RELATED APPLICATIONS

This application is a U.S. National Stage entry of PCT Application No: PCT/JP2018/018033 filed on May 10, 2018, which claims priority to Japanese Patent Application No. 2017-095964, filed May 12, 2017, the contents of which are incorporated herein by reference.

TECHNICAL FIELD

The present disclosure relates to a vehicle control device and a vehicle control method.

BACKGROUND ART

There has been proposed a technique for setting a shift schedule, in which fuel consumption amount is minimized in a travel route based on road information of a travel route from a current position of a vehicle to a target position thereof and drive force of the vehicle in the travel route (see PTL 1).

CITATION LIST

Patent Literature

PTL 1: JP-A-9-21457

SUMMARY OF INVENTION

Technical Problem

However, in a case where shift transmission is performed based on drive force of a vehicle, downshifting may be performed immediately after upshifting depending on the condition of the travel route. When the shift transmission is frequently performed during traveling of the vehicle, a driver may feel uncomfortable in some cases.

The present disclosure is made in view of these aspects, and an object thereof is to provide a vehicle control device and a vehicle control method, by which an uncomfortable feeling of a driver driving the vehicle can be reduced.

Solution to Problem

According to a first aspect of the present disclosure, there may be provided a vehicle control device comprising: a current gear stage selection unit configured to select a current gear stage based on travel resistance of a vehicle, the current gear stage being a gear stage of the vehicle in a current travel segment where the vehicle is currently travelling; a next gear stage selection unit configured to select a next gear stage that is a gear stage of the vehicle in a next travel segment ahead of the vehicle in the travel direction, the next travel segment being a travel segment with road slope different from that of the current travel segment; and a shift control unit configured to, in a case the current gear stage selection unit newly selects a target gear stage higher than the next gear stage while the vehicle is traveling in the current travel segment at the current gear stage, control shift to maintain the current gear stage with preventing upshifting from the current gear stage to the target gear stage, wherein in a case the shift control unit estimates that an engine rotational speed is equal to or greater than a predetermined value while the vehicle is currently traveling in the current travel segment in a state where the upshifting is prevented, the shift control unit is configured to control the shift to upshift to the target gear stage without preventing the upshifting.

In a case the shift control unit estimates that the engine rotational speed is equal to or greater than the predetermined value at an end point of the current travel segment, the shift control unit may be configured to control the shift to upshift to the target gear stage without preventing the upshifting.

In a case the shift control unit estimates stall amount of the vehicle in a case of travelling in the next travel segment at the target gear stage and determines that the stall amount is equal to or smaller than a predetermined threshold, the shift control unit may be configured to control the shift to upshift to the target gear stage without preventing the upshifting.

For example, the shift control unit may be configured to determine a predetermined threshold of the stall amount in a case where the vehicle speed is high to be a predetermined threshold of the stall amount, which is larger than the predetermined threshold of the stall amount in a case where the vehicle speed is low.

According to a second aspect of the present disclosure, there may be provided A vehicle control method for a vehicle comprising a control unit, the method comprising controlling the control unit to perform; a step of selecting a current gear stage based on travel resistance of the vehicle, the current gear stage being a gear stage of the vehicle in a current travel segment where the vehicle is currently travelling; a step of selecting a next gear stage B that is a gear stage of the vehicle in a next travel segment ahead of the vehicle in the travel direction, the next travel segment being a travel segment with road slope different from that of the current travel segment; and a step of controlling shift comprising, in a case the step of selecting the current gear stage newly selects a target gear stage higher than the next gear stage while the vehicle is traveling in the current travel segment at the current gear stage, controlling the shift to maintain the current gear stage while preventing upshifting from the current gear stage to the target gear stage, wherein in the step of controlling the shift, in a case an engine rotational speed is estimated to be equal to or greater than a predetermined value while the vehicle is currently traveling in the current travel segment in a state where the upshifting is prevented, the shift is controlled to upshift to the target gear stage without preventing the upshifting.

Advantageous Effects of Invention

According to the present disclosure, it is possible to reduce an uncomfortable feeling of a driver driving a vehicle.

BRIEF DESCRIPTION OF DRAWINGS

FIG. 1 is a diagram for showing an outline of a vehicle according to an embodiment.

FIG. 2 is a diagram schematically showing an internal configuration of the vehicle according to the embodiment.

FIG. 3 is a diagram schematically showing a functional configuration of a vehicle control device according to the embodiment.

FIG. 4 is a flowchart of a processing in which a shift control unit controls shift based on an engine rotational speed.

FIG. 5 is a flowchart of a processing in which a shift control unit controls shift based on the stall amount of a vehicle.

DESCRIPTION OF EMBODIMENTS

Summary of Embodiment

FIG. 1 is a diagram for showing an outline of a vehicle V according to an embodiment. The outline of the vehicle V according to the embodiment will be described with reference to FIG. 1. The vehicle V according to the embodiment is a large vehicle which uses an engine, such as a diesel engine, to provide drive force.

In recent years, a computing device such as an electronic control unit (ECU) mounted on a vehicle has been widely used to automatically select a gear stage of a transmission so that a vehicle overcomes travel resistance to travel and fuel consumption of the vehicle is improved. Details will be described below, and the selection of the gear stage in the vehicle is performed by selecting, with reference to a fuel consumption contour map of the engine, a gear stage which improves the fuel consumption of the vehicle from gear stages which can generate torque which overcomes the travel resistance of the vehicle.

During travelling of the vehicle, an acceleration of the vehicle is proportional to an amount obtained by subtracting travel resistance of the vehicle from driving force of the vehicle, and is inversely proportional to weight of the vehicle. Accordingly, the ECU mounted on the vehicle estimates the travel resistance of the vehicle from the driving force of the vehicle, the weight of the vehicle, and the acceleration of the vehicle, and selects a gear stage capable of generating a torque which overcomes the travel resistance. However, in a case where the ECU estimates the travel resistance using the acceleration of the vehicle, the ECU can estimate the travel resistance of the vehicle at a currently traveling position, but cannot estimate the travel resistance at a position ahead of the currently traveling position.

Therefore, the ECU of the vehicle V according to the embodiment estimates the travel resistance at the next position by obtaining slope information of a road at the position ahead of the currently traveling position. A summary of a method for estimating the travel resistance at the next position by the vehicle V according to the embodiment obtaining slope information will be described below.

The vehicle V according to the embodiment has a satellite navigation function of acquiring position information showing a current position of the vehicle V based on information received from a navigation satellite. In addition, the vehicle V stores slope information of a road on which the vehicle V travels. The vehicle V may have an autonomous navigation function of acquiring a current position of the vehicle V based on an output value of an acceleration sensor or the like without using the information received from the navigation satellite.

The ECU of the vehicle V prefetches, based on the slope information of the road and the position information of the vehicle V, slope information of a road on which the vehicle V will travel in the near future. In FIG. 1, the vehicle V is traveling in a "current travel segment" having a point A as a start point and a point B as an end point. In the example shown in FIG. 1, a road on which the vehicle V is traveling is an upslope above a certain level in a "next travel segment" having the point B as a start point and a point C as an end point. The "next travel segment" is a travel segment whose average slope of the road is different from that of the current travel segment on which the vehicle V is currently traveling, and is a travel segment ahead of the vehicle V in a travel direction.

The slope information of the next travel segment prefetched by the ECU is determined from the slope information stored by the vehicle V and the position information of the vehicle V. The travel resistance of the vehicle V is dominated by slope resistance, air resistance, and rolling resistance, and the slope resistance among the above resistance can be estimated. As a result, the ECU can estimate the travel resistance of the next travel segment.

The vehicle V performs upshifting from a current gear stage in current traveling to a gear stage higher than the current gear stage in the current traveling in which high-fuel consumption traveling may be performed. Subsequently, when the vehicle V enters the next travel segment which is an upslope, the vehicle V shifts to a low next gear stage for traveling in the next travel segment, which can generate torque that overcomes the travel resistance of the vehicle. At this time, shift changes are frequently performed if an interval between the upshifting and the downshifting performed by the vehicle V is short. Accordingly, the driver driving the vehicle V may feel uncomfortable.

Therefore, the vehicle V according to the embodiment selects the next gear stage for traveling in the next travel segment based on pre-read slope information of the next travel segment in a case where upshifting is performed, and prevents upshifting to an optimum gear stage in a case where the optimum gear stage in the current travel segment (high-fuel consumption traveling may be performed in the current travel segment) is a gear higher than B the next gear stage for traveling in the next travel segment, thereby reducing the uncomfortable feeling of the driver. In addition, the vehicle V according to the embodiment can reduce the frequent shift changes, so that it is possible to prevent deterioration of the fuel consumption of the vehicle V due to changes in engine rotational speed accompanying the shift changes.

(Configuration of Vehicle According to Embodiment)

An internal configuration of the vehicle V according to the embodiment will be described with reference to FIG. 2. FIG. 2 is a diagram schematically showing an internal configuration of the vehicle V according to the embodiment. The vehicle V according to the embodiment includes an engine 1, a transmission 2, a global positioning system (GPS) sensor 3, a weight sensor 4, a speed sensor 5, an accelerator opening sensor 6, and a vehicle control device 10 as the ECU.

The vehicle V is a large vehicle that uses the engine 1, such as a diesel engine, to provide drive force, and is, in particular, a vehicle which has an automatic cruise mode. The transmission 2 transmits rotational drive force of the engine 1 to a drive wheel (not shown) of the vehicle V. The transmission 2 includes a plurality of stages of gears for converting the rotational drive force of the engine 1. In the present embodiment, the transmission 2 is assumed to include first to twelfth forward gear stages and a reverse gear stage.

Here, the "automatic cruise mode" in the vehicle V refers to a mode in which the engine 1, the transmission 2, and the like are automatically controlled by the ECU so as to maintain a speed of the vehicle V set in advance even if the driver does not operate the accelerator or a shift lever. It is mainly assumed that the automatic cruise mode is used when the vehicle V travels on a highway. When the vehicle V travels on a highway with few slopes, the fuel consumption of the vehicle V may be improved if a gear of the transmission 2 is selected from the twelfth stage or the eleventh stage.

The GPS sensor 3 receives and analyzes radio waves transmitted from a plurality of navigation satellites, so as to acquire a position of the GPS sensor 3, that is, a position of the vehicle V on which the GPS sensor 3 is mounted. The GPS sensor 3 outputs information indicating the position of the vehicle V to the vehicle control device 10.

The weight sensor 4 obtains total weight of the vehicle V. Specifically, the weight sensor 4 obtains the total weight of the vehicle V by measuring weight of a load of the vehicle V and adding up the weight of the load and weight of the vehicle V alone excluding the load. The weight sensor 4 outputs information indicating the total weight of the vehicle V to the vehicle control device 10.

The speed sensor 5 measures the speed of the vehicle V. The speed sensor 5 outputs information indicating the measured speed to the vehicle control device 10. The accelerator opening sensor 6 measures an accelerator opening degree that is a press-down amount of a pedal of an accelerator by a driver of the vehicle V. The accelerator opening sensor 6 outputs information indicating the accelerator opening degree to the vehicle control device 10.

The vehicle control device 10 obtains information from each of the sensors described above, and controls, based on the obtained information, the amount of fuels to be supplied to a cylinder in the engine 1 and the gear stages of the transmission 2. In a case where the vehicle V is in the automatic cruise mode, the vehicle control device 10 controls the engine 1 and the transmission 2 so that the vehicle V travels at a set speed. In addition, in a case where a speed limit device (SLD) of the vehicle V (not shown) is operating, the vehicle control device 10 controls the engine 1 and the transmission 2 so that the speed of the vehicle V does not exceed the set maximum speed.

FIG. 3 is a diagram schematically showing a functional configuration of the vehicle control device 10 according to the embodiment. The vehicle control device 10 according to the embodiment includes a storage unit 11 and a control unit 12.

The storage unit 11 is, for example, a read only memory (ROM) or a random access memory (RAM). The storage unit 11 stores various programs for causing the control unit 12 to function. The storage unit 11 may store map information, and may store information indicating the road gradient of the road. Further, the storage unit 11 may store a travel performance diagram of the vehicle V.

The control unit 12 is a computational resource which includes a processor such as a central processing unit (CPU; not shown). The control unit 12 achieves functions of a current B gear stage selection unit 13, a road slope obtaining unit 14, a travel segment determination unit 15, a next gear stage selection unit 16, and a shift control unit 17 by executing a program stored in the storage unit 11.

The current gear stage selection unit 13 selects a current gear stage, which is a gear stage of the transmission 2 in the segment where the vehicle V is traveling, based on an estimated value of the travel resistance of the vehicle V on the road on which the vehicle V is currently traveling. The travel resistance is calculated based on the rolling resistance of the drive wheel of the vehicle V, the air resistance of the vehicle V, and the slope resistance.

Here, the current gear stage selection unit 13 calculates the travel resistance based on, for example, drive force calculated from output torque of engine 1, the speed of the vehicle V measured by the speed sensor 5, and total weight of the vehicle V obtained by the weight sensor 4, but is not limited to the examples. The current gear stage selection unit 13 may calculate the travel resistance based on road slope on the road on which the vehicle V is currently traveling, which is obtained by the road slope obtaining unit 14, and the total weight of the vehicle V obtained by the weight sensor 4.

The current gear stage selection unit 13 selects a current gear stage by referring to a travel performance diagram of the vehicle V stored in the storage unit 11, so that the drive force of the vehicle V at a current speed of the vehicle V is larger than the travel resistance of the vehicle V in a currently travel state.

The road slope obtaining unit 14 obtains the road slope in a road where the vehicle is currently travelling. The road slope obtaining unit 14 obtains, based on the information indicating the position of the vehicle V obtained from the GPS sensor 3 and map information stored in the storage unit 11, the road slope on the road on which the vehicle V is currently traveling.

The travel segment determination unit 15 determines a next travel segment ahead of the vehicle in a travel direction, which is a travel segment with a road slope different from that of the current travel segment where the vehicle is currently traveling. The travel segment determination unit 15 determines the next travel segment, based on, for example, the road slope obtained by the road slope obtaining unit 14, so that the road slope is substantially constant.

The next gear stage selection unit 16 selects the next gear stage, which is a gear stage of the vehicle V in the next travel segment. The next gear stage selection unit 16 selects the next gear stage, which is a gear stage of the transmission 2 in the next travel segment, based on, for example, the road slope of the next travel segment and the speed of the vehicle V. Specifically, first, the next gear stage selection unit 16 estimates the travel resistance of the vehicle V in the next travel segment based on the road slope of the next travel segment, the speed of the vehicle V, and the weight of the vehicle V. The next gear stage selection unit 16 selects a next gear stage by referring to the travel performance diagram of the vehicle V, so that the drive force of the vehicle V at the current speed of the vehicle V is larger than the travel resistance of the vehicle V in the next travel segment.

The shift control unit 17 controls a shift of the gear stage of the transmission 2 based on the current gear stage selected by the current gear stage selection unit 13 and the next gear stage selected by the next gear stage selection unit 16. When the shift control unit 17 causes upshifting from the current gear to a target gear and immediately causes downshifting to the next gear stage, frequent shift changes are performed. Accordingly, the driver may feel uncomfortable. Therefore, the shift control unit 17 controls the shift so that shift changes are not frequently performed. Specifically, in a case where the current gear stage selection unit 13 newly selects a target gear stage higher than the next gear stage while the vehicle V is traveling in the current travel segment with the current gear stage, the shift control unit 17 controls shift of the gear stage of the transmission 2 so that the upshifting from the current gear stage to the target gear stage is prevented to maintain the current gear stage.

The shift control unit 17 may prevent the upshifting based on a travel distance from a current travelling position in the current travel segment to an end point of the current travel segment, or travel time. Specifically, the shift control unit 17 prevents the upshifting in a case where the travel distance is equal to or smaller than a predetermined travel distance or the travel time is equal to or shorter than predetermined travel time.

Here, the "predetermined distance" is an "upshifting determination reference threshold distance", which is referred in order to determine whether the shift control unit 17 causes the gear stage of the transmission 2 in the current travel segment to upshift from the current gear stage to the target gear stage. A specific value of the upshifting determination reference threshold distance may be determined by an experiment in consideration of slope information of a road on which the vehicle V is assumed to travel, the performance of the engine 1 provided in the vehicle V, and the like, but is, for example, 1.5 kilometers. This is a distance in which the vehicle V traveling at a speed of 90 kilometer/h travels in one minute. As a result, the shift control unit 17 can prevent the driver of the vehicle V from feeling that the shift is repeated in a short time. The upshifting determination reference threshold distance is stored in the storage unit 11.

Here, the "predetermined time" is an "upshifting determination reference threshold time", which is referred in order to determine whether the shift control unit 17 causes the gear stage of the transmission 2 in the current travel segment to upshift from the current gear stage to the target gear stage. A specific value of the upshifting determination reference threshold time may be determined by an experiment in consideration of slope information of a road on which the vehicle V is assumed to travel, the performance of the engine 1 provided in the vehicle V, and the like, but is, for example, one minute. As a result, the shift control unit 17 can prevent the driver of the vehicle V from feeling that the shift is repeated in a short time. The upshifting determination reference threshold time is stored in the storage unit 11.

The shift control unit 17 may cause the upshifting rather than preventing the upshifting in a case of satisfying the predetermined conditions, even if the vehicle is in a state where the upshifting is prevented. Hereinafter, the case where the shift control unit 17 causes the upshifting rather than preventing the upshifting will be described specifically. It should be noted that the vehicle V is assumed to travel in the current travel segment with a gear stage of the eleventh gear stage in the following description, but the gear stage is not particularly limited.

(Case where Engine Rotational Speed is Equal to or Greater than Predetermined Value)

When the engine rotational speed of the engine 1, while the vehicle V is currently travelling in the current travel segment in a state where the upshifting is prevented, is estimated to be equal to or greater than a predetermined value, the shift control unit 17 controls the shift so that upshifting to the target gear stage is performed without preventing the upshifting. In this way, the shift control unit 17 can perform upshifting before the engine fails, so that the feeling of the driver driving the vehicle can be reduced.

A method of estimating a rotational speed of the engine in the travelling of the vehicle in the current travel segment by the shift control unit 17 will be described. The shift control unit 17 obtains the slope information of the current travel segment stored in the storage unit 11, and calculates the travel resistance in the current travel segment. Next, the shift control unit 17 calculates acceleration of the vehicle V based on a difference between the drive force in the current gear stage and the travel resistance. Subsequently, the shift control unit 17 calculates, by using the calculated acceleration, a predicted speed while the vehicle V is currently travelling in the current travel segment. Then, the shift control unit 17 estimates, based on the predicted speed and the current gear stage, the rotational speed of the engine while the vehicle V is currently travelling in the current travel segment.

Here, a "predetermined value" of the engine rotational speed is an "upshifting determination reference rotational speed", which is referred in order to determine whether the shift control unit 17 causes the upshifting to the target gear stage while the vehicle V is currently travelling in the current travel segment. The upshifting determination reference rotational speed may be determined in consideration of the performance of the engine 1, and may be determined based on, for example, an upper limit of the rotational speed (revolution limit) applied to the engine 1. In a case where a revolution limit of the engine 1 is 2000 rpm, the upshifting determination reference rotational speed is, for example, 1500 rpm, but is not limited to the example. In this way, the shift control unit 17 can cause the transmission 2 to upshift before the engine 1 fails.

In a case where the engine rotational speed is estimated to be equal to or greater than the predetermined value at the end point of the current travel segment, the shift control unit 17 may control the shift so that upshifting to the target gear stage is performed without preventing the upshifting. In this way, the shift control unit 17 may estimate the rotational speed of the engine only at the end point of the current travel segment. Accordingly, the calculation amount of the shift control unit 17 can be reduced.

Hereinafter, processing of controlling the shift based on the engine rotational speed by the shift control unit 17 will be described. FIG. 4 is a flowchart of a processing in which a shift control unit controls shift based on the engine rotational speed.

First, the current gear stage selection unit 13 selects a new target gear stage (S1). Subsequently, the next gear stage selection unit 16 selects a next gear stage (S2). Then, the shift control unit 17 determines whether the target gear stage is a gear stage higher than the next gear stage (S3).

In a case where the target gear stage is determined to be a gear stage identical to the next gear stage or a gear stage lower than the next gear stage (No in S3), the shift control unit 17 controls shift of a gear stage of the transmission 2 to become the target gear stage (S4). Specifically, in a case where the target gear stage is a gear stage of the twelfth stage which is identical to the next gear stage, the shift control unit 17 controls shift of the gear stage of the transmission 2 so that the gear stage of the transmission 2 is upshifted from the eleventh stage as the current gear stage to the twelfth stage as the target gear stage. In a case where the target gear stage is a gear stage of eleventh stage lower than the next gear stage, the shift control unit 17 controls shift of the gear stage of the transmission 2 so that the gear stage of the transmission 2 is downshifted from the eleventh stage as the current gear stage to the tenth stage as the target gear stage.

In a case where the target gear stage is determined to be a gear stage higher than the next gear stage (Yes in S3), the shift control unit 17 estimates, based on the road slope of the current travel segment stored in the storage unit 11 and the speed of the vehicle V, the engine rotational speed while the vehicle is currently travelling in the current travel segment (S5). The shift control unit 17 determines whether the estimated engine rotational speed is equal to or greater than the predetermined value (S6).

In a case where the engine rotational speed is determined to be equal to or greater than the predetermined value (Yes in S6), the shift control unit 17 controls the shift of the gear stage of the transmission 2 so that upshifting to the target gear stage is performed without preventing the upshifting (S7). Specifically, in a case where the engine rotational speed is estimated to be equal to or greater than the predetermined value, the shift control unit 17 controls the shift of the gear stage of the transmission 2 so that the gear stage of the transmission 2 is upshifted from the eleventh stage as the current gear stage to the twelfth stage as the target gear stage. In a case where the engine rotational speed is determined to be less than the predetermined value (No in S6), the shift control unit 17 controls the shift so that the upshifting is prevented to maintain the current gear stage (S8). Specifically, in a case where the shift control unit 17 determines that the target gear stage is the gear stage of the twelfth stage, which is higher than the eleventh stage as the next gear stage, the shift control unit 17 maintains the eleventh stage that is the current gear stage.

(Case where the Amount of Decrease in Vehicle Speed is Equal to or Smaller than Predetermined Threshold)

In a case where the stall amount is estimated, which is the amount of decreases in a speed of the vehicle in the case of traveling in the next travel segment at the target gear stage, and the stall amount is equal to or smaller than a predetermined threshold, the shift control unit 17 controls the shift so that upshifting to the target gear stage is performed without preventing the upshifting. The "predetermined threshold" of the stall amount is a "stall allowable value" which can allow a decrease in the vehicle speed. In addition, the stall allowable value may be determined in advance through experiments so that both the fuel consumption of the vehicle V and the uncomfortable feeling given to the driver are compatible, and is, for example, about 10% of the vehicle speed. However, the present disclosure is not limited to the example. The stall allowable value is stored in the storage unit 11.

Hereinafter, processing of controlling shift based on the stall amount of the vehicle by the shift control unit 17 will be described. FIG. 5 is a flowchart of a processing in which the shift control unit 17 controls shift based on the stall amount of the vehicle.

The processing from S1 to S7 in the flowchart of FIG. 5 is the same as the processing in the flowchart of FIG. 4, so that descriptions thereof are omitted. In a case where the engine rotational speed is determined to be less than the predetermined value (No in S6), the shift control unit 17 estimates the stall amount in the case of traveling in the next travel segment with the target gear (S10). Specifically, the shift control unit 17 estimates, based on a difference between the travel resistance of the next travel segment and the drive force of the vehicle V, the stall amount which is the amount of decreases in the speed of the vehicle in the case of travelling in the next travel segment with the target gear stage (S10). Then, the shift control unit 17 determines whether the stall amount is equal to or smaller than the predetermined threshold (S11).

In a case where the stall amount is determined to be larger than the predetermined threshold (No in S11), the shift control unit 17 performs controlling so that the upshifting is prevented to maintain the current gear stage (S12). In a case where the stall amount is determined to be equal to or lower than the predetermined threshold (Yes in S11), the shift control unit 17 controls the shift of the gear stage of the transmission 2 so that upshifting to the target gear stage is performed without preventing the upshifting (S7). In this way, the shift control unit 17 can make the stall amount equal to or smaller than a predetermined threshold in the case of traveling in the next travel segment, so that the uncomfortable feeling of the driver can be reduced. The shift control unit 17 performs the upshifting, so that the vehicle V can be perform high-fuel consumption traveling. Further, the shift control unit 17 performs upshifting while the vehicle V is currently traveling in the current travel segment, and can set the stall amount of the vehicle V to be equal to or smaller than the predetermined threshold even in a case where the speed of the vehicle V is reduced when the vehicle V enters a next travel segment with large slope resistance such as uphill roads. Accordingly, unnecessary stall of the vehicle V can be prevented.

The driver driving the vehicle V changes the way of feeling the amount of decreases in the speed of the vehicle according to the speed of the vehicle V. The driver feels uncomfortable when feeling that the speed of the vehicle V has greatly decreased. For example, the driver does not feel that the speed has greatly decreased even if the speed of the vehicle V is slightly reduced in a case where the speed of the vehicle V is high. In contrast, the driver feels that the speed has greatly decreased in a case where the speed of the vehicle V is low even if the speed of the vehicle is slightly reduced.

The shift control unit 17 may determine the predetermined threshold of the stall amount based on the speed of the vehicle. For example, the shift control unit 17 determines a predetermined threshold of the stall amount in a case where the vehicle speed is high to be a predetermined threshold of the stall amount, which is larger than the predetermined threshold of the stall amount in a case where the vehicle speed is low. Specifically, the shift control unit 17 determines the predetermined threshold based on a predetermined ratio with respect to the vehicle speed. The predetermined ratio is, for example, 10%. The shift control unit 17 determines a predetermined threshold of the stall amount as 8 km/h in a case where a speed of the vehicle is 80 km/h, and determines a predetermined threshold of the stall amount as 6 km/h in a case where a speed of the vehicle is 60 km/h.

In this way, the shift control unit 17 can determine a predetermined threshold of the stall amount in consideration of differences in feelings of the driver with respect to the speed of the vehicle V, so that the uncomfortable feeling experienced by the driver can be reduced. In addition, the shift control unit 17 can cause the vehicle to travel with higher fuel consumption.

Effect of Embodiment

As described above, when the shift control unit 17 estimates that the engine rotational speed is equal to or greater than a predetermined value during traveling in the current travel segment in a state where the upshifting is prevented, the shift control unit 17 controls the shift so as to upshift to the target gear without preventing the upshifting. In this way, the shift control unit 17 can perform upshifting before the engine fails, so that the feeling of the driver can be reduced and the drive feeling can be improved.

The present disclosure have been described using the embodiment, but the technical scope of the present disclosure is not limited to the above-described embodiment and various modifications and changes can be made within the scope of the present disclosure. For example, the specific embodiment of the dispersion and integration of the device is not limited to the above embodiment, and all or a part of the embodiment may be functionally or physically distributed and integrated in optional units. In addition, new embodiments generated by any combination of a plurality of embodiments are also contained in the embodiment of the present disclosure. The effect of the new embodiment caused by the combination has the effect of the original embodiment.

(Modification)

The vehicle control device 10 may further include a horsepower limitation unit (not shown) which limits output horsepower of an engine by controlling fuel injection amount with respect to the engine 1 in accordance with accelerator operation of a driver. For example, the horsepower limitation unit limits the output horsepower of the engine based on the travel resistance of the vehicle. Specifically, the horsepower limitation unit limits the output horsepower of the engine such that predetermined allowance drive force is contained with respect to the travel resistance.

The horsepower limitation unit releases the output horsepower limitation of the engine in a case where the shift control unit 17 prevents the upshifting. In this way, the horsepower limitation unit can prevent decrease in the speed of the vehicle even in a case where the vehicle V travels in a segment, such as an uphill road, where the travel resistance increases. Therefore, the horsepower limitation unit can reduce the uncomfortable feeling of the driver, and can improve the drive feeling.

This application is based on the Japanese Patent Application (2017-095964), filed on May 12, 2017, the contents of which are incorporated herein by reference.

INDUSTRIAL APPLICABILITY

The present invention has the effect of reducing an uncomfortable feeling of a driver driving a vehicle, and is useful for a vehicle control device and a vehicle control method.

REFERENCE SIGNS LIST

1: Engine
2: Transmission
3: GPS sensor
4: Weight sensor
5: Speed sensor
6: Accelerator opening degree sensor
10: Vehicle control device
11: Storage unit
12: Control unit
13: Current gear stage selection unit
14: Road slope obtaining unit
15: Travel segment determination unit
16: Next gear stage selection unit
17: Shift control unit

The invention claimed is:

1. A vehicle control device comprising an electronic control unit configured to:
 select a current gear stage based on travel resistance of a vehicle, the current gear stage being a gear stage of the vehicle in a current travel segment where the vehicle is currently travelling;
 select a next gear stage that is a gear stage of the vehicle in a next travel segment ahead of the vehicle in the travel direction, the next travel segment being a travel segment with road slope different from that of the current travel segment; and
 in a case the electronic control unit newly selects a target gear stage higher than the next gear stage while the vehicle is traveling in the current travel segment at the current gear stage, control shift to maintain the current gear stage with preventing upshifting from the current gear stage to the target gear stage,
 wherein in a case the controlling of the shift estimates that an engine rotational speed is equal to or greater than a predetermined value while the vehicle is currently traveling in the current travel segment in a state where the upshifting is prevented, the electronic control unit is configured to control the shift to upshift to the target gear stage without preventing the upshifting.

2. The vehicle control device according to claim 1,
 wherein in a case the controlling of the shift estimates that the engine rotational speed is equal to or greater than the predetermined value at an end point of the current travel segment, the electronic control unit is configured to control the shift to upshift to the target gear stage without preventing the upshifting.

3. The vehicle control device according to claim 1,
 wherein in a case the controlling of the shift estimates stall amount of the vehicle in a case of travelling in the next travel segment at the target gear stage and determines that the stall amount is equal to or smaller than a predetermined threshold, the electronic control unit is configured to control the shift to upshift to the target gear stage without preventing the upshifting.

4. The vehicle control device according to claim 3,
 wherein the electronic control unit is configured to determine the predetermined threshold of the stall amount in a case where the vehicle speed is high to be the predetermined threshold of the stall amount, which is larger than the predetermined threshold of the stall amount in a case where the vehicle speed is low.

5. A vehicle control method for a vehicle comprising an electronic control unit, the method comprising controlling the electronic control unit to perform:
 selecting a current gear stage based on travel resistance of the vehicle, the current gear stage being a gear stage of the vehicle in a current travel segment where the vehicle is currently travelling;
 selecting a next gear stage that is a gear stage of the vehicle in a next travel segment ahead of the vehicle in the travel direction, the next travel segment being a travel segment with road slope different from that of the current travel segment; and
 controlling shift comprising, in a case the selecting of the current gear stage newly selects a target gear stage higher than the next gear stage while the vehicle is traveling in the current travel segment at the current gear stage, controlling the shift to maintain the current gear stage while preventing upshifting from the current gear stage to the target gear stage,
 wherein in the controlling of the shift, in a case an engine rotational speed is estimated to be equal to or greater than a predetermined value while the vehicle is currently traveling in the current travel segment in a state where the upshifting is prevented, the shift is controlled to upshift to the target gear stage without preventing the upshifting.

6. The vehicle control method according to claim 5,
 wherein in the controlling of the shift, in a case the engine rotational speed is estimated to be equal to or greater than the predetermined value at an end point of the current travel segment, the shift is controlled to upshift to the target gear stage without preventing the upshifting.

7. The vehicle control method according to claim 5,
 wherein in the controlling of the shift, in a case where stall amount of the vehicle in a case of travelling in the next travel segment at the target gear stage is estimated and the stall amount is determined to be equal to or smaller than a predetermined threshold the shift is controlled to upshift to the target gear stage without preventing upshifting.

8. The vehicle control method according to claim 7, wherein in the controlling of the shift, the predetermined threshold of the stall amount in a case where the vehicle speed is high is determined to be the predetermined threshold of the stall amount, which is larger than the predetermined threshold of the stall amount in a case where the vehicle speed is low.

* * * * *